(12) United States Patent
Siminoff

(10) Patent No.: US 10,999,503 B2
(45) Date of Patent: May 4, 2021

(54) PRE-ROLL IMAGE CAPTURE IMPLEMENTED BY A POWER LIMITED SECURITY DEVICE

(71) Applicant: AMAZON TECHNOLOGIES, INC., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 4 days.

(21) Appl. No.: 16/032,966

(22) Filed: Jul. 11, 2018

(65) Prior Publication Data

US 2019/0020827 A1 Jan. 17, 2019

Related U.S. Application Data

(60) Provisional application No. 62/531,616, filed on Jul. 12, 2017.

(51) Int. Cl.
| | |
|---|---|
| *H04N 5/232* | (2006.01) |
| *H04N 7/18* | (2006.01) |
| *G08B 13/196* | (2006.01) |
| *H04N 5/765* | (2006.01) |

(52) U.S. Cl.
CPC . *H04N 5/232411* (2018.08); *G08B 13/19667* (2013.01); *G08B 13/19669* (2013.01); *H04N 5/23251* (2013.01); *H04N 5/765* (2013.01); *H04N 7/186* (2013.01); *H04N 7/188* (2013.01)

(58) Field of Classification Search
CPC .. H04N 5/232411; H04N 7/186; H04N 7/188; H04N 5/23251; H04N 5/765; G08B 13/19669; G08B 13/19667

USPC .................................................... 348/208.16
See application file for complete search history.

(56) References Cited

U.S. PATENT DOCUMENTS

| | | |
|---|---|---|
| 7,193,644 B2 | 3/2007 | Carter |
| 8,139,098 B2 | 3/2012 | Carter |
| 8,144,183 B2 | 3/2012 | Carter |
| 8,154,581 B2 | 4/2012 | Carter |
| 8,780,201 B1 | 7/2014 | Scalisi et al. |

(Continued)

OTHER PUBLICATIONS

PCT/US2018/041656 International Search Report and Written Opinion dated Nov. 20, 2018, 12 pages.

*Primary Examiner* — Lin Ye
*Assistant Examiner* — Chan T Nguyen
(74) *Attorney, Agent, or Firm* — Lathrop GPM LLP

(57) ABSTRACT

A pre-roll image capture method implemented by a power-limited security device includes a step of, in response to initialization, or when no motion is detected within an area monitored by the device for at least a duration, capturing a first plurality of images of the monitored area at a first image-capture frequency. The method also includes storing the first plurality of images in a cyclic buffer of the device. The method also includes, in response to detected motion within the monitored area, capturing a second plurality of images of the monitored area at a second image-capture frequency that exceeds the first frequency. The method also includes storing the second plurality of images at the device and, after storing of the second plurality of images, transmitting the first plurality of images from the cyclic buffer and the second plurality of images to a client device associated with the device.

20 Claims, 7 Drawing Sheets

(56) References Cited

U.S. PATENT DOCUMENTS

| | | | |
|---|---|---|---|
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2004/0174442 A1* | 9/2004 | Chosa | H04N 5/772 348/231.1 |
| 2007/0189728 A1* | 8/2007 | Yu | H04N 5/232 386/226 |
| 2012/0262592 A1 | 10/2012 | Rabii | |
| 2014/0098286 A1* | 4/2014 | Kannermark | H04N 5/23241 348/372 |
| 2014/0192024 A1 | 7/2014 | Holz | |
| 2015/0098686 A1 | 4/2015 | Obukhov et al. | |
| 2016/0344924 A1 | 11/2016 | Tsai et al. | |
| 2018/0091569 A1* | 3/2018 | Roth | H04N 21/2407 |
| 2018/0103238 A1* | 4/2018 | Wu | H04N 7/186 |

\* cited by examiner

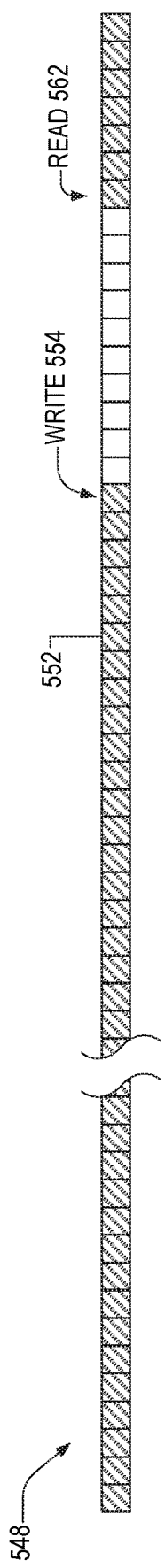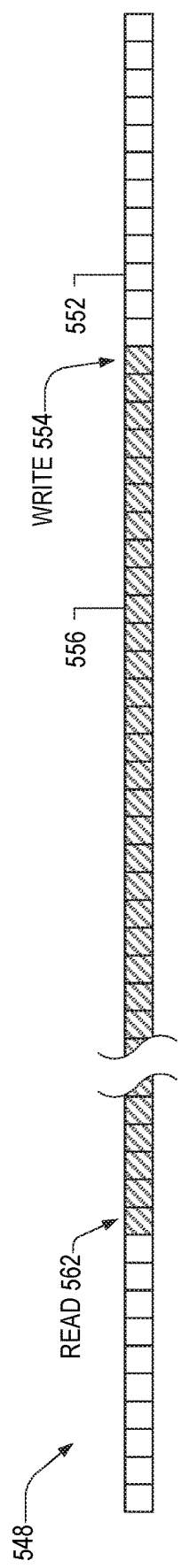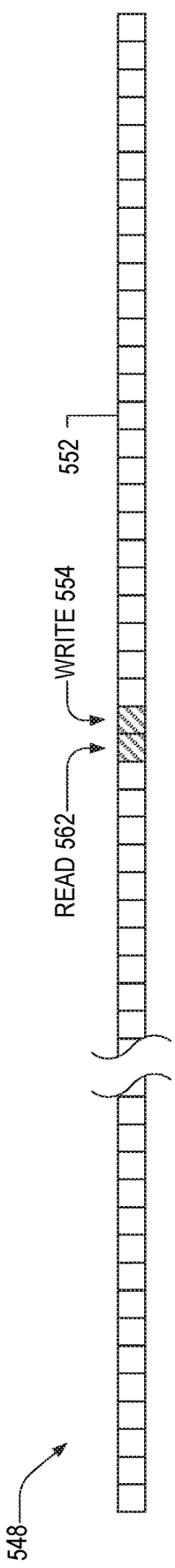

PRE-ROLL IMAGE CAPTURE IMPLEMENTED BY A POWER LIMITED SECURITY DEVICE

CROSS-REFERENCE TO RELATED APPLICATIONS

This application claims priority to provisional application Ser. No. 62/531,616, filed on Jul. 12, 2017, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication device, such as doorbells, provide this functionality, and may also aid in crime detection and prevention. For example, audio and/or video captured by an A/V recording and communication doorbell may be uploaded to the cloud and recorded on a remote server. Subsequent review of the A/V footage may aid law enforcement in capturing perpetrators of home burglaries and other crimes. Further, the presence of one or more A/V recording and communication devices at the exterior of a home, such as a doorbell unit at the entrance of a home, acts as a powerful deterrent against would-be burglars.

SUMMARY

The various embodiments of the present pre-roll image capture implemented by a power-limited security device have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that although current hard-wired A/V recording and communication devices may have the capability of recording continuously (e.g., having the camera constantly activated), which may include recording before and after a motion event, battery-powered A/V recording and communication devices may not include similar functionality due to concerns about battery life. For example, because constant recording by a camera increases battery consumption, current battery-powered A/V recording and communication devices do not include any images of events that took place prior to the event that triggered the sending of streaming video to a user's client device. For example, when the battery-powered A/V recording and communication device detects an event, such as motion in the area about the battery-powered A/V recording and communication device, the streaming video that is sent from the battery-powered A/V recording and communication device to the user's client device begins at (or just after) the moment that the motion was detected or the front button was pressed (e.g., when the battery-powered A/V recording and communication device is a doorbell). Often, however, the events that occurred just prior to the event detection are of interest to the user.

The present embodiments solve this problem by activating the camera of the battery-powered A/V recording and communication device to capture images at an image capture frequency that is less than the image capture frequency for recording live video. As a result, images are captured prior to event detection without requiring constant recording by the camera, thereby reducing battery consumption while still providing the images of interest to the user. The present embodiments thus advantageously enable the user to view images of events that happened just prior to the detected event, thereby delivering more information to the user to help the user better understand what is taking place in the streaming video. With the availability of this additional information, the user may be more likely to take appropriate actions, such as to signal an alarm, alert law enforcement, notify neighbors, etc., thereby leading to safer homes and neighborhoods.

In a first aspect, an electronic device has a camera. Based at least in part on at least one of initialization of the electronic device or no motion being detected within a field of view of the electronic device for a duration, the camera is used to capture a first plurality of images of a field of view of the camera at a first frequency. The first plurality of images are stored in a cyclic buffer of the electronic device. Based at least in part on motion being detected in the field of view of the electronic device, the camera captures a second plurality of images of the field of view of the camera at a second frequency greater than the first frequency. The first plurality of images from the cyclic buffer and the second plurality of images are transmitted to at least one of a backend server or a client device associated with the electronic device.

In certain embodiments of the first aspect, based at least in part on motion being detected in the field of view of the electronic device, the camera switches out of a power-save mode.

In certain embodiments of the first aspect, based at least in part on no motion being detected in the field of view of the electronic device for another duration, the camera switches into power-save mode.

In certain embodiments of the first aspect, the camera switches into power-save mode while capturing the first plurality of images.

In certain embodiments of the first aspect, a controlled component of the electronic device or communicatively coupled to the electronic device is activated based at least in part on the motion being detected in the field of view of the electronic device.

In certain embodiments of the first aspect, the controlled component comprises at least one of a doorbell, an internal floodlight, or an external floodlight.

In certain embodiments of the first aspect, the first frequency is selected to reduce power consumption by the camera of the electronic device as compared to power used by the camera at the second frequency.

In certain embodiments of the first aspect, the first frequency is 10 frames-per-second and the second frequency is 30 frames-per-second.

Certain embodiments of the first aspect further includes storing the second plurality of images in the cyclic buffer.

In certain embodiments of the first aspect, the transmitting of the first plurality of images and the second plurality of images comprises transmitting the first plurality of images and the second plurality of images to the client device via the backend server.

In certain embodiments of the first aspect, the first plurality of images and the second plurality of images are stored at the server.

In certain embodiments of the first aspect, the duration is between a tenth of a second and one second.

In a second aspect, an electronic device comprises: a battery; a camera, a motion sensor; one or more processors; and a memory storing machine-readable instructions that, when executed by the one or more processors, cause the one or more processors to: capture images at a first frequency when no motion is detected in at least one of a field of view or a field of view of the motion sensor; store the first plurality of images in a cyclic buffer; capture images at a second frequency greater than the first frequency when motion is detected in at least one of the field of view of the camera or the field of view of the motion sensor; and transmit the first plurality of images and the second plurality of images to a remote server.

In certain embodiments of the second aspect, the electronic device uses less power when capturing the first plurality of images at the first frequency than when capturing the second plurality of images at the second frequency.

In certain embodiments of the second aspect, the first frequency is ten frames-per-second and the second frequency is thirty frames-per-second.

In certain embodiments of the second aspect, the second plurality of images are stored in at least one of the cyclic buffer or the memory of the electronic device.

In certain embodiments of the second aspect, the duration is between a tenth of a second and one second.

In a third aspect, an electronic device includes a camera, a processor, a memory, and a communication module. Prior to detection of an event within a monitored area about the electronic device: the camera switches at a first rate from a power-save mode, to an operational mode, and back to the power-save mode; captures at least one still image of the monitored area each time the camera is in the operational mode; and stores the at least one still image captured each time the camera is in the operation mode in a cyclic buffer of the memory at the first rate to create stored still images. The event within the monitored area about the electronic device is detected. After the detection of the event within the monitored area about the electronic device: the camera switches into the operational mode; the camera captures video images of the monitored area; and the processor executes a write operation to write the video images into the cyclic buffer at a first rate. While the processor continues to write the video images into the cyclic buffer at the first rate, the processor executes a read operation to read the stored still images from the cyclic buffer at a second rate that is greater than the first rate. The processor continues to read the images out of the cyclic buffer at the second rate until the read operation catches up to the write operation. After the read operation catches up to the write operation, the processor reads the video images out of the cyclic buffer at the second rate. The communication module transmits streaming video to at least one of a client device or a backend server. A beginning portion of the streaming video is streamed at a first stream rate and thereafter the streaming video is streamed at a second stream rate less than the first stream rate.

In an embodiment of the third aspect, after the read operation catches up to the write operation, the processor continues to write the video images into the cyclic buffer at the first rate.

In an embodiment of the third aspect, the transmitting the streaming video includes transmitting the streaming video to the client device via the backend server In a fourth aspect, a power-limited security device, comprising: a camera configured to record video image data of an area about the power-limited security device; a motion detector for detecting motion within the area about the power-limited security device; a memory; a communication module configured to transmit streaming video to a client device; and a processor; the processor configured to: prior to detection of motion by the motion detector: control the camera to capture a first image of the monitored area; store the first image in a cyclic buffer; switch the camera into a power-save mode; and repeat the steps of controlling, storing, and switching, to capture a first plurality of images at a first rate; after detection of motion by the motion detector: control the camera to capture a second plurality of images of the monitored area at a second rate, faster than the first rate; store the second plurality of images in the cyclic buffer; and send the second plurality of images from the cyclic buffer to the client device via the communication module; wherein the communication module is configured to stream the first plurality of images from the cyclic buffer to the client device at a first stream rate and thereafter to stream the second plurality of images from the cyclic buffer to the client device at a second stream rate greater than the first stream rate.

BRIEF DESCRIPTION OF THE FIGURES

The various embodiments of the present pre-roll image capture implemented by a power-limited security device now will be discussed in detail with an emphasis on highlighting the advantageous features. These embodiments depict the novel and non-obvious pre-roll image capture implemented by a power-limited security device shown in the accompanying drawings, which are for illustrative purposes only. These drawings include the following figures, in which like numerals indicate like parts:

FIGS. 5-11 are schematic diagrams of a rolling buffer that may be included in the power-limited security device of FIG. 2, in an embodiment.

DETAILED DESCRIPTION OF THE EMBODIMENTS

Figure 1:
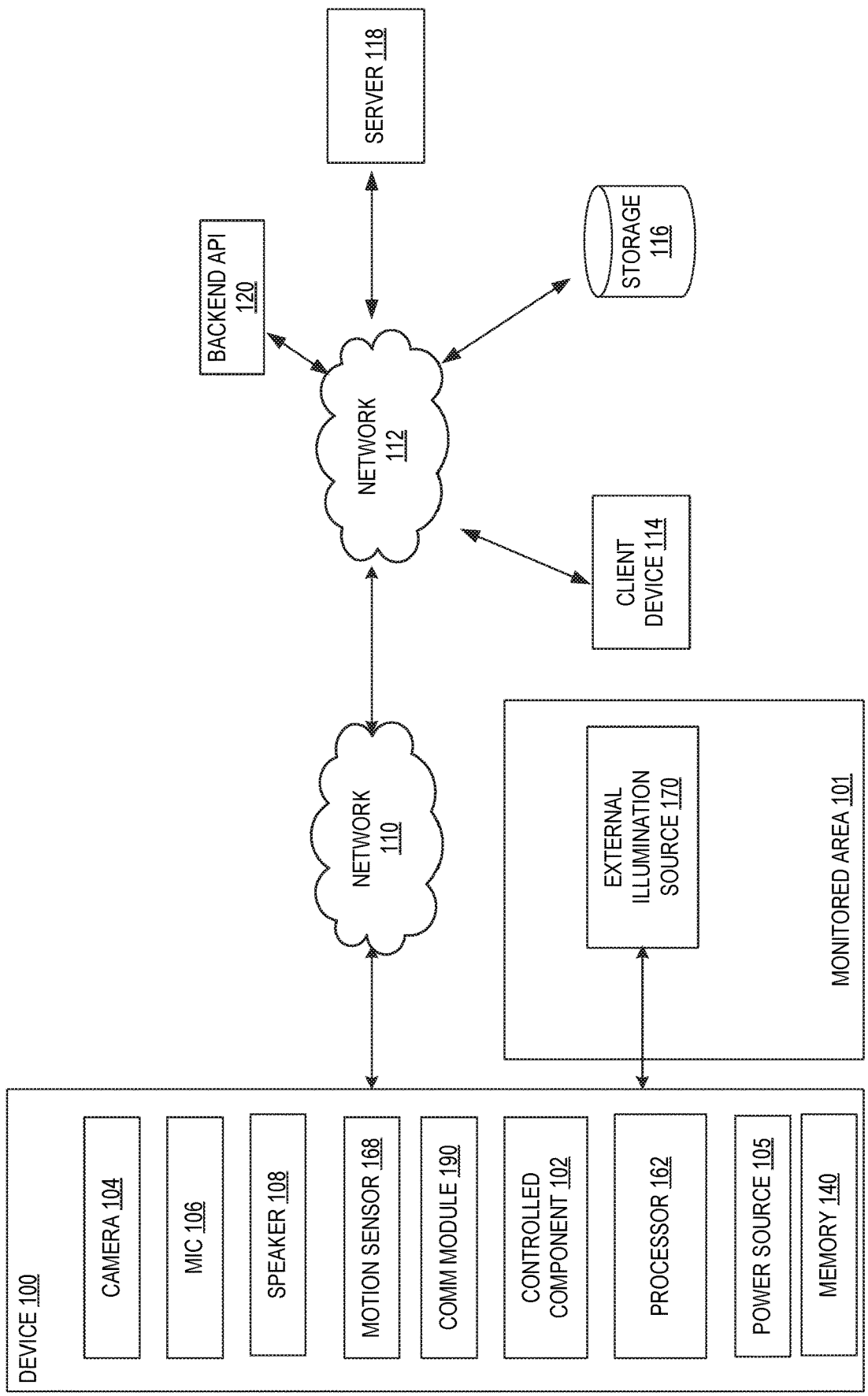
FIG. 1 is a functional block diagram of a power-limited security device, in an embodiment.

The following detailed description describes the present embodiments with reference to the drawings. In the drawings, reference numbers label elements of the present embodiments. These reference numbers are reproduced below in connection with the discussion of the corresponding drawing features.

The embodiments of the present pre-roll image capture implemented by a power-limited security device are described below with reference to the figures. These figures, and their written descriptions, indicate that certain components of the apparatus are formed integrally (e.g., a single unitary piece), and certain other components are formed as separate pieces. Components shown and described herein as being formed integrally may in alternative embodiments be formed as separate pieces. Further, components shown and described herein as being formed as separate pieces may in alternative embodiments be formed integrally.

FIG. 1 is a functional block diagram of a power-limited security device 100, which may include a camera 104, a power source 105, a processor 162, and a motion sensor 168. An embodiment of the power-limited security device 100 may also include at least one of a controlled component 102, a microphone 106, a speaker 108, a memory 140, and a communication module 190. The controlled component 102 may include, but is not limited to, at least one of a doorbell, an internal floodlight, and an external floodlight. The power-limited security device 100 may be configured to monitor a monitored area 101, which may include an external illumination source 170 that the power-limited security device 100 is configured to control. The processor 162 may include, and may also be referred to as, a controller or a microcontroller.

In an example mode of operation, the power-limited security device 100 communicates with a user's wireless network 110. Although the user's wireless network 110 is referred to herein as a wireless network, the user's wireless network, in some embodiments, may not be wireless, such as where the power-limited security device 100 is connected to the user's network via an Ethernet connection, for example. The user's wireless network 110 is connected to another network 112. The networks 110 and 112 may be the same network, in some of the present embodiments. The networks 110 and 112, may include but are not limited to the Internet, a public switched telephone network (PSTN), a Wi-Fi network compatible with the IEEE 802.11 standard and/or other wireless communication standard(s) including but not limited to WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), Z-Wave, RIM (Research in Motion, Limited) duplex paging network, Bluetooth radio, or an IEEE 802.11-based radio frequency network. As described below, the power-limited security device 100 may communicate with a user's client device 114 via the user's wireless network 110 and/or the network 112. The user's client device 114 may comprise, for example, a computer, a laptop, a tablet, a mobile telephone (may also be referred to as a cellular telephone), such as a smartphone, a personal digital assistant (PDA), or another communication device capable of receiving and/or transmitting data across one or both of the networks 110, 112. The user's client device 114 comprises a display (e.g., similar to the user interface (display) 1206 of FIG. 12, described below) and related components capable of displaying streaming and/or recorded video images. The user's client device 114 may also comprise a speaker and related components capable of broadcasting streaming and/or recorded audio, and may also comprise a microphone.

The power-limited security device 100 may also communicate with one or more remote storage device(s) 116 (may be referred to interchangeably as "cloud storage device(s)"), one or more servers 118, and/or a backend API (application programming interface) 120 via the user's wireless network 110 and the network 112 (Internet/PSTN). While FIG. 1 illustrates the remote storage device 116, the server 118, and the backend API 120 as components separate from the network 112, it is to be understood that the remote storage device 116, the server 118, and/or the backend API 120 may be considered to be components of the network 112.

According to one or more aspects of the present embodiments, when a person (may be referred to interchangeably as "visitor") arrives at the power-limited security device 100, the power-limited security device 100 detects the visitor's presence and begins capturing video images within a field of view of the camera 104. The field of view of the camera 104 may correspond to the monitored area 101. The power-limited security device 100 may also capture audio through the microphone 106. The power-limited security device 100 may detect the visitor's presence by detecting motion using the camera 104 and/or the motion sensor 168, and/or by detecting that the visitor has depressed a button (e.g., a doorbell button) on the power-limited security device 100.

In response to the detection of the visitor, the power-limited security device 100 sends an alert to the user's client device 114 (FIG. 1) via the user's wireless network 110 and/or the network 112. The power-limited security device 100 may also send streaming video, and may also send streaming audio, to the user's client device 114. If the user answers the alert, two-way audio communication may then occur between the visitor and the user through the power-limited security device 100 and the user's client device 114. The user may view the visitor throughout the duration of the call, but the visitor cannot see the user (unless the power-limited security device 100 includes a display, which it may in some embodiments).

The video images captured by the camera 104 of the power-limited security device 100 (and, in some embodiments, the audio captured by the microphone 106) may be uploaded to the cloud and recorded on the remote storage device 116. In some of the present embodiments, the video and/or audio may be recorded on the remote storage device 116 even if the user chooses to ignore the alert sent to the user's client device 114. In such embodiments, the user may access the video and/or audio at a later time by accessing the remote storage device 116 using the user's client device 114.

The backend API 120 may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

The memory 140 may be transitory and/or non-transitory and may represent one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of the memory 140 may be integrated with the processor 162.

Figure 2:
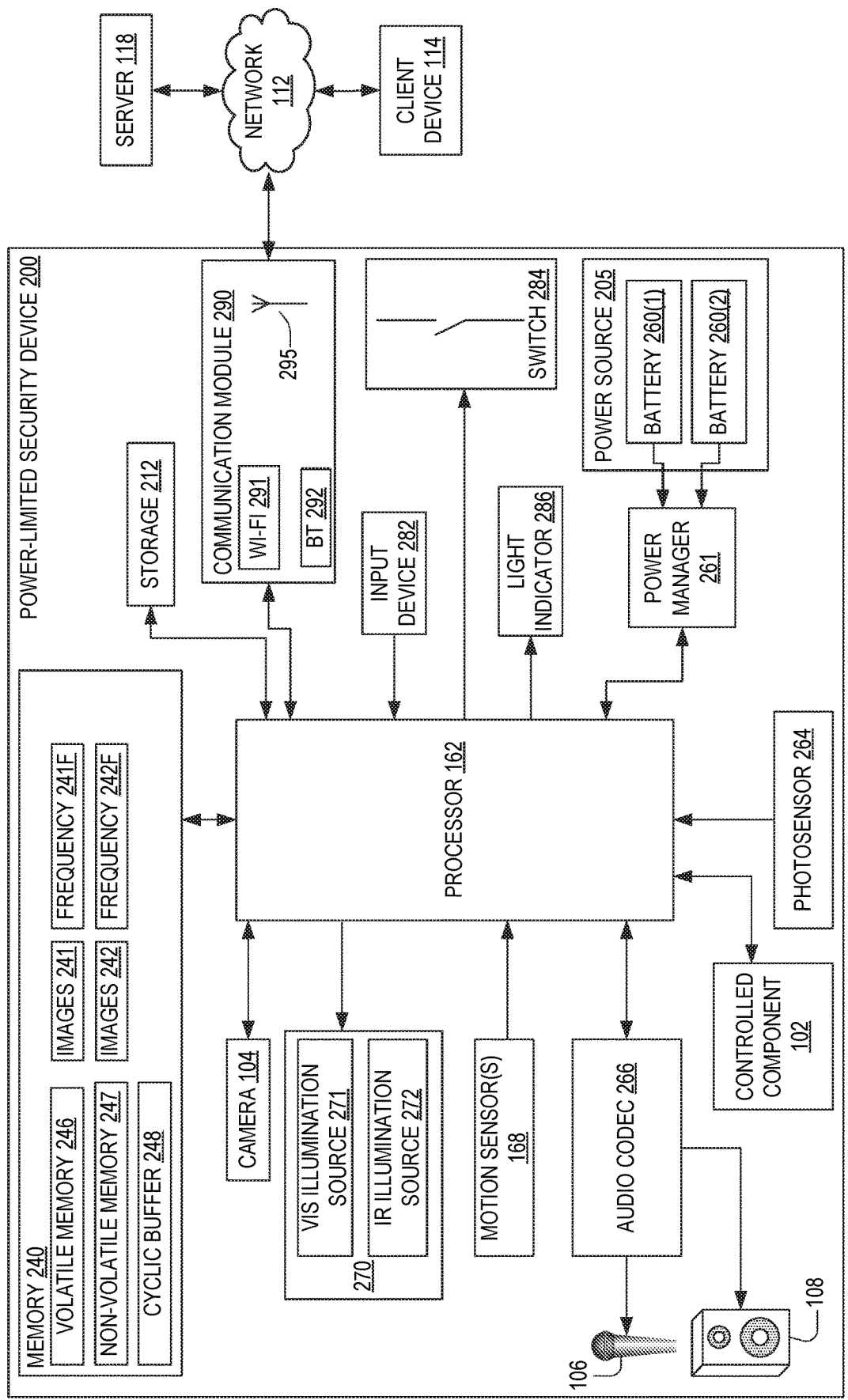
FIG. 2 is a functional block diagram of a power-limited security device, which is an example of the power-limited security device of FIG. 1.

FIG. 2 is a functional block diagram illustrating components of a power-limited security device 200, which is an embodiment of the power-limited security device 100 of FIG. 1. The power-limited security device 200 includes a power source 205, a memory 240, and a communication module 290, which are examples of the power source 105, the memory 140, and the communication module 190, respectively, of the power-limited security device 100. An embodiment of the power-limited security device 200 may also include the controlled component 102, a photosensor 264, an audio codec 266, an illumination source 270, an input device 282, a light indicator 286, each of which, when included, may be communicatively coupled to the processor 162. The illumination source 270 is an example of the external illumination source 170.

The power-limited security device 200 may also include a power manager 261. The power source 205 includes at least two batteries 260(1) and 260(2), in some of the present embodiments. However, in other embodiments, the power source 205 may include more or fewer batteries, including zero batteries if the power source 205 is hardwired to an electrical power source of a structure to which the power-limited security device 200 is mounted. Each of the batteries 260(1) and 260(2) may be electrically connected to the power manager 261. The audio codec 266 may drive the speaker 108 and receive input from the microphone 106. The illumination source 270 may include a visible illumination source 271 and an infrared illumination source 272. The input device 282 may be, for example, a button, an electrical switch, and/or a manually operated electromechanical device.

The memory 240 includes a cyclic buffer 248, and in certain embodiments, may also include a volatile memory 246 and/or a non-volatile memory 247. The cyclic buffer 248 may be part of the volatile memory 246 and/or the non-volatile memory 247.

The memory 240 may store a first image-capture frequency 241F and a second image-capture frequency 242F, which exceeds the first image-capture frequency 241F. The memory 240 may also store a first plurality of images 241, captured at the first image-capture frequency 241F, and a second plurality of images 242, captured at the second image-capture frequency 242F. The second image-capture frequency 242F may exceed the first image-capture frequency 241F. In some of the present embodiments, the second image-capture frequency 242F may exceed the first image-capture frequency 241F by, for example, at least a factor of two, a factor of three, a factor of five, a factor of ten, a factor of twenty, or a factor of thirty. For example, the first image-capture frequency 241F may be one frame-per-second (fps) and the second image-capture frequency 242F may be thirty fps. In another example, the first image-capture frequency 241F may be ten fps and the second image-capture frequency 242F may be 30 fps. In some of the present embodiments, the first image-capture frequency 241F may be determined such that the images 241 display as still images or, in other words, display without seamless transitions between the images 241, in the video image data and the second image-capture frequency 242F may be determined such that the images 242 display as streaming video in the video image data, as described in more detail below.

At least one of the images 241 and the images 242 may be captured periodically, quasiperiodically or aperiodically, such that the image-capture frequencies 241F and 242F represent an average image-capture frequency of the images 241 and 242. For example, the camera 104 may capture a quantity $N_1$ of the images 241 over a time duration $T_1$, such that the first image-capture frequency 241F equals $N_1/T_1$. Similarly, the camera 104 may capture a quantity $N_2$ of the images 241 over a time duration $T_2$, such that the second image-capture frequency 241F equals $N_2/T_2$, which exceeds $N_1/T_1$.

The power manager 261 manages the power source 105 to provide electrical power to operate the power-limited security device 200, as described below. The power manager 261 may comprise an electronic circuit that operates to condition power from the batteries 260 and to select which of the batteries 260(1) and 260(2) (in embodiments with more than one battery) power is drawn from. For example, the power manager 261 may draw power from the battery 260(1), and may switch to draw power from the battery 260(2) when the battery 260(1) is drained. By drawing power from only one of the batteries 260 at a time, the power-limited security device 200 may continue operation when the depleted one of the batteries 260 is removed for recharging. In some embodiments, the power-limited security device 200 may further include a switch 284 controlled by the processor 162 to activate the external illumination source 170 (in embodiments in which the power-limited security device 200 is connected to the external illumination source 170).

The processor 162 may perform data processing and various other functions of the power-limited security device 200, as described below. In some embodiments, the processor 162, the volatile memory 246, the non-volatile memory 247, and/or programmable input/output peripherals (not shown) may be configured as an integrated circuit. The volatile memory 246 may be implemented as DDR3 SDRAM (double data rate type three synchronous dynamic random-access memory). The non-volatile memory 247 may be implemented as NAND flash memory. Although the volatile memory 246 and the non-volatile memory 247 are shown outside the box representing the processor 162 in the example of FIG. 2, in some embodiments the volatile memory 246 and/or the non-volatile memory 247 may be physically incorporated with the processor 162, such as on the same integrated circuit (chip). The volatile memory 246 and/or the non-volatile memory 247, regardless of their physical location, may be shared by one or more other components (in addition to the processor 162) of the power-limited security device 200. In certain embodiments, the power-limited security device 200 includes additional storage 212 that may be implemented as any type of non-volatile data storage, such as, for example, and without limitation, hard disks/drives, flash memory, or any other suitable memory/storage element. In some embodiments, the non-volatile memory 247 and the additional storage 212 may be combined as a single non-volatile memory. The additional storage 212, when included, may be operatively connected to the processor 162 and may be used to store audio and/or video information captured by the power-limited security device 200, as described in further detail below.

As described in further detail below, the camera 104 and the infrared illumination source 272 may cooperate to facilitate night vision functionality of the power-limited security device 200. For example, the photosensor 264 may be configured to detect a level of ambient light about the power-limited security device 200. The processor 162 may use the input from the photosensor 264 to control operation of the infrared illumination source 272 and the camera 104 to activate and deactivate night vision, as described in further detail below. In some embodiments, the camera 104 may include a video recording sensor or a camera chip. In some embodiments, the infrared illumination source 272 may include one or more IR light-emitting diodes (LEDs).

The transfer of digital audio between the user (via the user's client device 114) and a visitor (or intruder) may be compressed and decompressed using the audio codec 266, as described below. The motion sensor 168 may include one or more passive infrared (PIR) sensors, or any other type of sensor(s) capable of detecting and communicating to the processor 162 the presence and/or motion of an object within its field of view. In some embodiments, one or more of the passive infrared sensors (PIRs) may comprise a pyroelectric infrared sensor. When triggered by the motion sensor 168, the processor 162 may perform one or more functions, as described below.

The communication module 290 includes at least one antenna 295 and is configured to handle communication between the power-limited security device 200 and other, external devices or receivers, and to route incoming/outgoing data appropriately. For example, inbound data from the antenna 295 may be routed through the communication module 290 before being directed to the processor 162, and outbound data from the processor 162 may be routed through the communication module 290 before being directed to the antenna 295. The communication module 290 may include one or more transceiver modules capable of transmitting and receiving data, and using, for example, one or more protocols and/or technologies, such as a Wi-Fi network compatible with the IEEE 802.11 standard and/or other wireless communication standard(s) including but not limited to WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), Z-Wave, RIM (Research in Motion, Limited) duplex paging network, Bluetooth radio, or an IEEE 802.11-based radio frequency network or any other protocol and/or technology. In the illustrated embodiment, the communication module 290 may include a Wi-Fi chip 291 and a Bluetooth chip 292 that implement medium-range wireless communication protocols and short-range wireless communication protocols, respectively, but these components are merely examples and are not limiting. Further, while the Wi-Fi chip 291 and the Bluetooth chip 292 are illustrated within the box representing the communication module 290, the embodiment illustrated in FIG. 2 is merely an example, and in some embodiments the Wi-Fi chip 291 and/or the Bluetooth chip 292 may not necessarily be physically incorporated with the communication module 290.

In some embodiments, the communication module 290 may further comprise a wireless repeater (not shown, may also be referred to as a wireless range extender). The wireless repeater may be configured to receive a wireless signal from a wireless router (or another network device) in the user's wireless network 110 and rebroadcast the signal. Wireless devices that are not within the broadcast range of the wireless router, or that only weakly receive the wireless signal from the wireless router, may receive the rebroadcast signal from the wireless repeater of the communication module 290, and may thus connect to the user's wireless network 110 through the power-limited security device 200. In some embodiments, the wireless repeater may include one or more transceiver modules (not shown) capable of transmitting and receiving data, and using, for example, one or more medium-range wireless communication protocols and/or technologies, such as Wi-Fi (IEEE 802.11), long-range wireless communication protocols, such as WiMAX (IEEE 802.16), or any other protocol and/or technology.

When a visitor (or intruder) in the monitored area 101 speaks, audio from the visitor (or intruder) is captured by the microphone 106 and may be compressed by the audio codec 266. Digital audio data may then be sent through the communication module 290 to the network 112 (FIG. 1) (in some embodiments via the user's wireless network 110), routed by the server 118 and/or the backend API 120, and delivered to the user's client device 114. When the user speaks, the user's client device 114 may capture digital audio data, which may then be transferred through the network 112 and/or the user's wireless network 110, the communication module 290, and the processor 162 to the audio codec 266 where it is decoded and emitted to the visitor through the speaker 108, which may be driven by an audio driver.

The input device 282 may have one or more functions, such as changing an operating mode of the power-limited security device 200 and/or triggering a reset of the power-limited security device 200. For example, when the input device 282 is activated (e.g., pressed and released), it may cause the communication module 290 of the power-limited security device 200 to enter an access point (AP) mode, which may facilitate connecting the power-limited security device 200 to the user's wireless network 110 and/or the network 112. Alternatively, or in addition, when the input device 282 is activated (e.g., pressed and held) for at least a threshold amount of time, it may trigger the erasing of any data stored by the volatile memory 246 and/or by the non-volatile memory 247, and/or may trigger a reboot of the processor 162.

In certain embodiments, the power-limited security device 200 may be configured to recognize a "wake-up" word or phrase (e.g., using the microphone 106 and the processor 162) that triggers a command input mode. When the command input mode is triggered, the power-limited security device 200 detects, using the microphone 106, a verbal command that may be recognized to cause the power-limited security device 200 to perform an action. For example, in an embodiment, when the user, within the monitored area 101, says the wake-up word or phrase followed by "turn on the lights," the power-limited security device 200 activates the illumination source 270. Similarly, in another embodiment, when the user, within the monitored area 101, says the wake-up word or phrase followed by "turn off the lights," the power-limited security device 200 deactivates the illumination source 270. In certain embodiments, recognition of the wake-up word or phrase may only occur when the motion sensor 168 and/or the camera 104 detects motion within the monitored area 101. In some embodiments, the available commands may be preconfigured within the power-limited security device 200. In other embodiments, the recognizable commands may be learned by the power-limited security device 200 from the user. In some embodiments, the power-limited security device 200 may be trained to recognize the voice of the user, and thereafter respond only to commands when that voice is recognized.

In certain embodiments, the power-limited security device 200 may use the camera 104 to recognize a face (e.g., the face of an authorized user). For example, in an embodiment, the power-limited security device 200 may include a learn mode through which the face(s) of one or more authorized user(s) is/are learned and stored within the non-volatile memory 247. Upon detecting and recognizing an authorized user's face, the power-limited security device 200 may enter a command input mode, in another embodiment, whereby verbal commands from the authorized user are interpreted and executed by the power-limited security device 200. In one example, where the authorized user stands facing the power-limited security device 200 and says "turn the lights on," the security device of certain embodiments activates the illumination source 270 after recognizing the authorized user's face. Similarly, when the authorized user faces the power-limited security device 200 and says "turn off the lights," the power-limited security device 200 may deactivate the illumination source 270 after recognizing the authorized user's face. In some embodiments, the power-limited security device 200 may use a lip-reading algorithm to interpret the authorized user's verbal command.

In some embodiments, the power-limited security device 200 may detect one or more gestures by the authorized user, interpret the gesture as a command, and then execute that command. For example, where the authorized user faces the power-limited security device 200 and makes an arm waving gesture, once the power-limited security device 200 recognizes the face of the authorized user, the power-limited security device 200 of this example detects the arm waving movements and activates the illumination source 270.

In certain embodiments, the power-limited security device 200 may be configured with one or more threshold values for detecting motion, wherein, for example, a first threshold value defines when the illumination source 270 is activated and a second threshold value defines when audio/video is captured and recorded. For example, where the motion sensor 168 and/or the camera 104 detects movement (e.g., with respect to the camera, by detecting a number of changed pixels in different video frames, or with respect to the motion sensor(s) 168, by detecting a voltage change based on the amount of infrared radiation) at a level that is greater than the first threshold value, but less than the second threshold value, the power-limited security device 200 may activate the illumination source 270 and yet not capture and record audio/video data. However, where the motion sensor 168 and/or the camera 104 detects movement (e.g., with respect to the camera 104, by detecting a number of changed pixels, or with respect to the motion sensor(s) 168, by detecting a voltage change based on the amount of infrared radiation) at a level that is greater than the first threshold value, and also greater than the second threshold value, the power-limited security device 200 may activate the illumination source 270 and also capture and record audio/video data. Thus, the power-limited security device 200 of certain embodiments may activate the illumination source 270 and capture audio/video data of a person moving within the monitored area 101, but may only activate the illumination source 270 (and not capture audio/video data) when an object smaller than a person moves through the monitored area 101.

In another embodiment, a first, or lowest, threshold value may define a level of detected motion that activates the illumination source 270, a second, or higher, threshold value may define a level of motion that activates recording of audio/video data, and a third, or highest, threshold value may define a level of motion that causes an alert to be sent to the user. These three threshold values may be configured and/or combined to define functionality of the power-limited security device 200. For example, for motion that is above the first threshold value but below the second threshold value, the illumination source 270 is activated, but no audio/video data is recorded, and no alert is sent to the user, whereas for motion that is above the second threshold value but below the third threshold value, the illumination source 270 is activated, and audio/video data is recorded, but no alert is sent to the user, and for motion that is above the third threshold value, the illumination source 270 is activated, audio/video data is recorded, and an alert is sent to the user.

In another example, the first and second threshold values may be equal and set to a relatively low value and the third threshold value may be set to a higher value. In such an embodiment, the illumination source 270 and the audio/video recording are activated together when the detected motion is above the lower threshold value, but no alert is sent to the user unless the detected motion is also above the higher threshold value. Thus, the user may configure the response of the power-limited security device 200 for various levels of detected motion.

In certain embodiments, the power-limited security device 200 may be configured to distinguish different types of objects within the monitored area 101, wherein functionality of the power-limited security device 200 may vary depending upon the type of object detected within the monitored area 101. For example, in an embodiment, the illumination source 270 may be activated when a vehicle and/or a person is detected, whereas audio/video data may start recording only when a person is detected (e.g., no recording when only a vehicle is detected and not a person). Any number of different algorithms and techniques may be used in the present embodiments for distinguishing different types of objects within the monitored area 101. For example, techniques for distinguishing humans from other types of objects include computer vision, thermal imaging, motion and scale-invariant feature transform (SIFT) methods, feature extraction based on the histogram of the oriented gradient (HOG) and geometric characteristics with a classifier based on support vector machine (SVM), adaptive boosting (Adaboost), soft-label boosting algorithms, Gaussian background-subtraction, texture change, expectation minimization (EM), image averaging, contour saliency map (CSM), CSM template matching, shape and appearance-based detection, spatiotemporal texture vectors, shape descriptors (e.g., compactness and/or leanness), principal component analysis (PCA), etc.

As described above, one aspect of the present embodiments includes the realization that although current hardwired A/V recording and communication devices may have the capability of recording continuously (e.g., having the camera constantly activated), which may include recording before and after a motion event, battery-powered A/V recording and communication devices may not include similar functionality due to concerns about battery life. For example, because constant recording by a camera increases battery consumption, current battery-powered A/V recording and communication devices do not include any images of events that took place prior to the event that triggered the sending of streaming video to a user's client device. For example, when the battery-powered A/V recording and communication device detects an event, such as motion in the area about the battery-powered A/V recording and communication device, the streaming video that is sent from the battery-powered A/V recording and communication device to the user's client device begins at (or just after) the moment that the motion was detected or the front button was pressed (e.g., when the battery-powered A/V recording and communication device is a doorbell). Often, however, the events that occurred just prior to the event detection are of interest to the user.

The present embodiments solve this problem by activating the camera of the battery-powered A/V recording and communication device to capture images at an image capture frequency that is less than the image capture frequency for recording live video. As a result, images are captured prior to event detection without requiring constant recording by the camera, thereby reducing battery consumption while still providing the images of interest to the user. The present embodiments thus advantageously enable the user to view images of events that happened just prior to the detected event, thereby delivering more information to the user to help the user better understand what is taking place in the streaming video. With the availability of this additional information, the user may be more likely to take appropriate actions, such as to signal an alarm, alert law enforcement, notify neighbors, etc., thereby leading to safer homes and neighborhoods.

Figure 3:
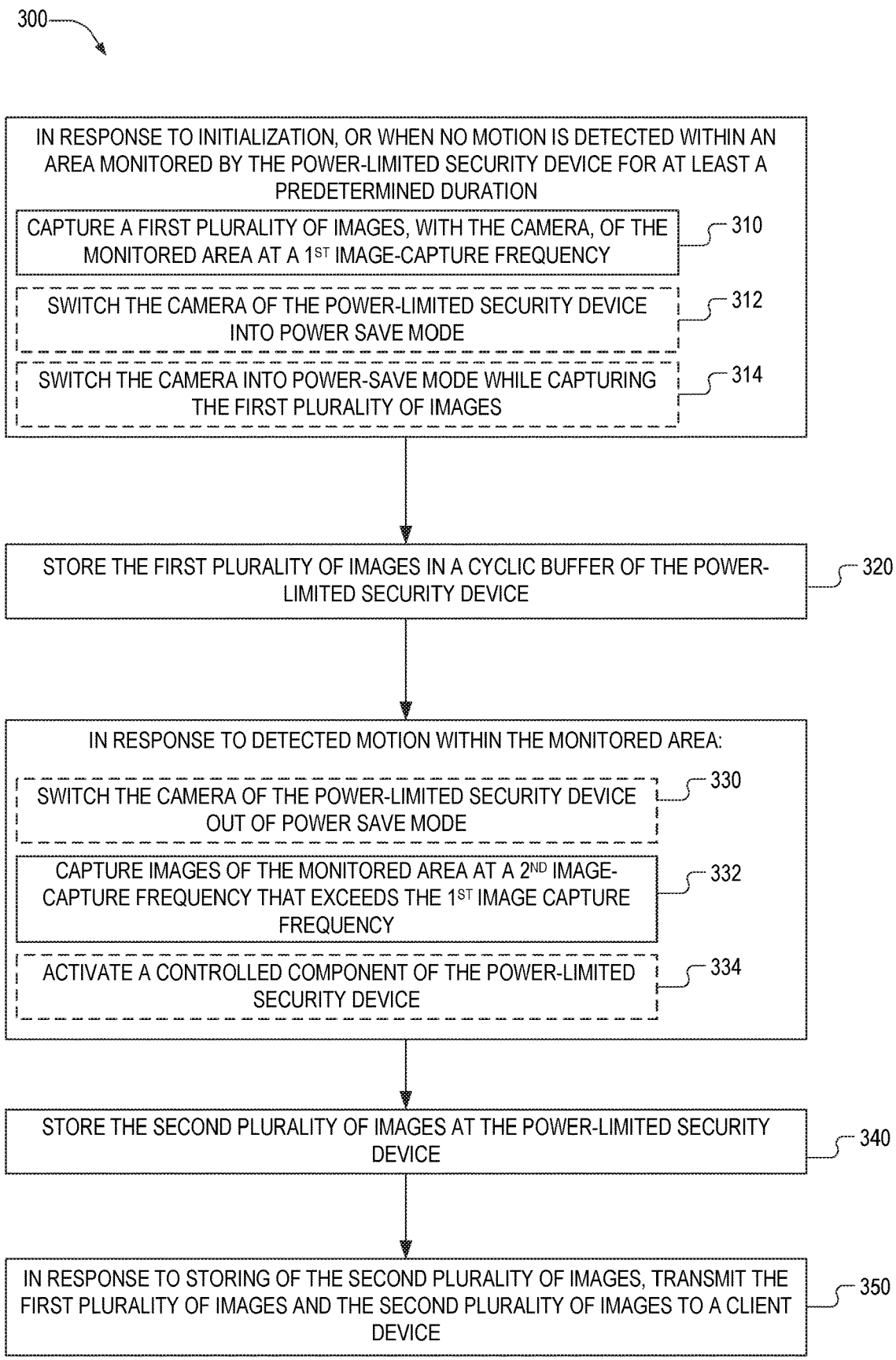
FIG. 3 is a flowchart illustrating an example pre-roll image capture method implemented by the power-limited security device of either FIG. 1 or FIG. 2, in an embodiment.

FIG. 3 is a flowchart illustrating an example pre-roll image capture method 300 implemented by a power-limited security device having a camera. The power-limited security device is, for example, the power-limited security device 100 or 200, in which the camera is the camera 104. The pre-roll image capture method 300 may be implemented by the power-limited security device 100 or the power-limited security device 200.

Block 310 is one of capturing a first plurality of images, with the camera, of the monitored area at a first image-capture frequency. Block 310 may occur in response to initialization (e.g., in response to the power-limited security device being activated or in response to a pre-roll mode being activated), or when no motion is detected within an area (e.g., the field of view of the camera 104 and/or the field of view of the motion sensor(s) 168) monitored by the power-limited security device for at least a duration (e.g., a tenth of a second, a fifth of a second, 1 second, 5 seconds, 10 seconds, 15 seconds, 20 seconds, or 30 seconds). In an example of block 310, the camera 104 may capture the images 241 of the monitored area 101 at the first image-capture frequency 241F (e.g., 30 frames-per-minute (fpm), 1 fps, 2 fps, 5 fps, 10 fps, 15 fps, or 20 fps).

An embodiment of the pre-roll image capture method 300 may also include a block 312, which, in response to no motion being detected in the monitored area for at least the duration, is one of switching the camera of the power-limited security device into a power-save mode. In an example of block 312, the processor 162 may switch the camera 104 into a power-save mode (e.g., by powering down the camera 104).

An embodiment of the pre-roll image capture method 300 that includes block 312 may also include a block 314, which is one of switching the camera into power-save mode while capturing the first plurality of images. In example of block 314, the processor 162 may switch the camera 104 into the power-save mode while capturing the images 241 of the monitored area 101. In an example mode of operation, the processor 162 may switch, at a first rate (e.g., ten times every second, five times every second, two times every second, once every second, once every 3 seconds, etc.), the camera 104 from a power-save mode, to an operational mode, and back to the power-save mode. That is, the power manager 261 may switch the camera 104 to the operational mode at the first rate, and also switch the camera 104 back to the power-save mode at the first rate. In some of the present embodiments, the first rate may equal the first image-capture frequency 241F.

Block 320 is one of storing the first plurality of images in a cyclic buffer of the power-limited security device. In an example of block 320, the memory 240 may store the images 241 captured at the first image-capture frequency 241F in the cyclic buffer 248.

Block 332 is one of, in response to detected motion within the monitored area, capturing a second plurality of images of the monitored area, with the camera, in which the captured images are captured at a second image-capture frequency that exceeds the first image-capture frequency. In an example of block 332, the camera 104 may capture the images 242 of the monitored area 101 at the second image-capture frequency 242F (e.g., 30 frames-per-second (fps), or 45 fps, or 60 fps). In some of the present embodiments, the second image-capture frequency 242F may be determined such that the images 242 display as a video in the video image data.

The pre-roll image capture method 300 may include a block 330. Block 330 is one of, in response to the detected motion within the monitored area, switching the camera of the power-limited security device out of power-save mode. In an example of block 330, the processor 162 may switch the camera 104 out of the power-save mode.

The pre-roll image capture method 300 may include a block 334, which is one of activating a controlled component of the power-limited security device in response to the detected motion in the monitored area. In an example of block 334, the processor 162 may activate the controlled component 102 in response to detected motion in the monitored area 101 (e.g., in response to the movement of a person in a field of view of the power-limited security device 100, 200).

Block 340 is one of storing the second plurality of images at the power-limited security device. In an example of block 340, the memory 240 may store the images 242 captured at the second image-capture frequency 242F. In this example of block 340, the memory 240 may store the images 242 in the cyclic buffer 248.

Block 350 is one of, after storing of the second plurality of images, transmitting the first plurality of images from the cyclic buffer and the second plurality of images to a client device associated with the power-limited security device. In an example of block 350, the communication module 290 transmits the images 241 and the images 242 to the user's client device 114 (e.g., via a server such as the server 118). In this example of block 350, the images 241 and 242 may be stored at the server 118.

Figure 4:
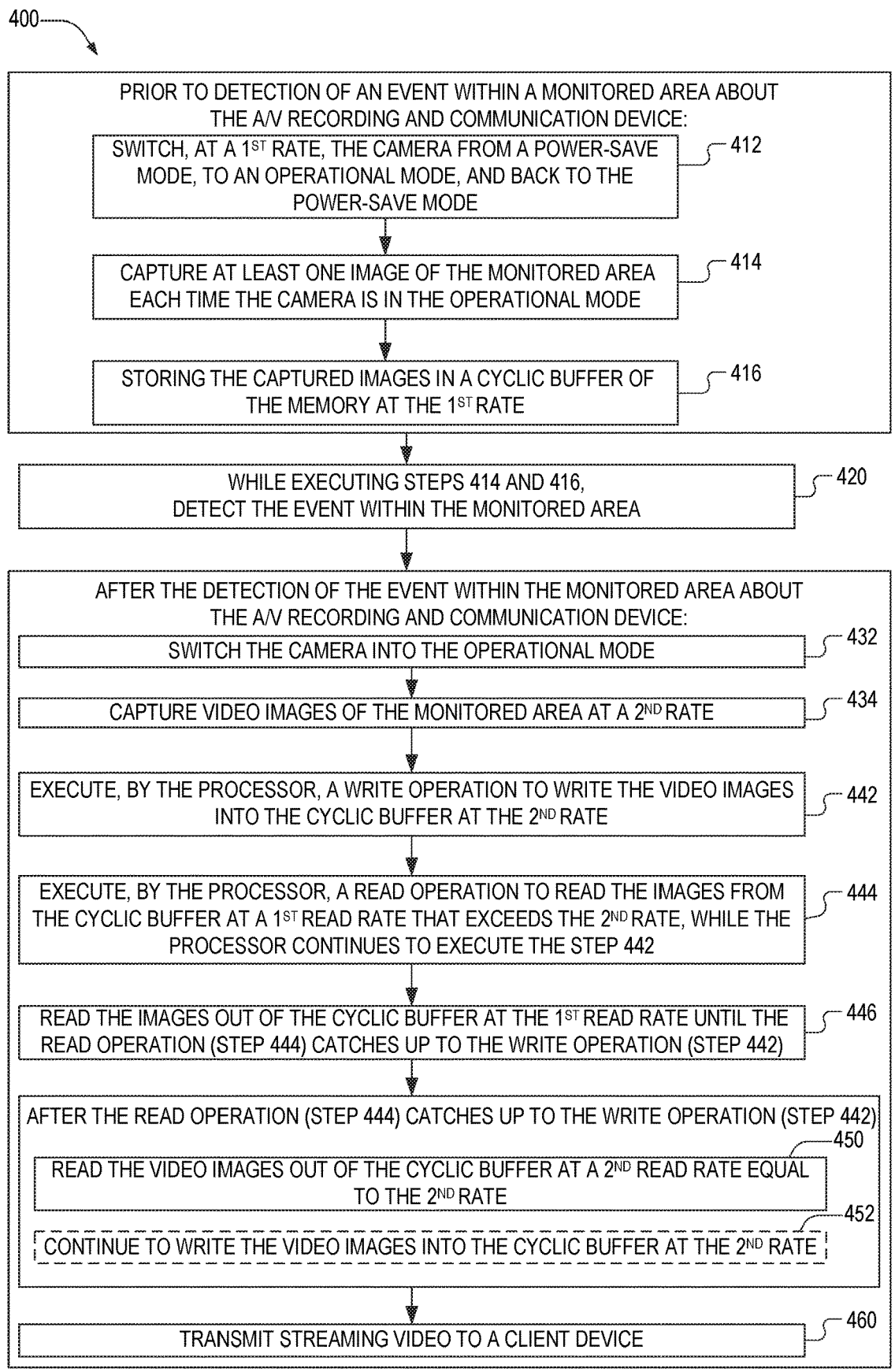
FIG. 4 is a flowchart illustrating an example pre-roll image capture that may be implemented by the power-limited security device of either FIG. 1 or FIG. 2, in an embodiment.

FIG. 4 is a flowchart illustrating an example pre-roll image capture method 400 for a power-limited security device. The power-limited security device is, for example, the power-limited security device 100 or 200, and may include the camera 104, the processor 162, the memory 140, 240, and the communication module 190, 290. The pre-roll image capture method 400 may be implemented by the power-limited security device 100 or the power-limited security device 200.

The pre-roll image capture method 400 includes blocks 412, 414, and 416, which may be executed prior to detection of an event within a monitored area about the power-limited security device 100, 200.

Block 412 is one of switching, at a first rate, the camera from a power-save mode, to an operational mode, and back to the power-save mode. In an example of block 412, the processor 162 may switch, at the first image-capture frequency 241F, the camera 104 from a power-save mode, to an operational mode, and back to the power-save mode.

In some of the present embodiments, the switch from the operational mode to the power-save mode may be in response to the motion sensor(s) 168 detecting motion. For example, as explained below with respect to block 420, the motion sensor(s) 168 may detect an event in the field of view of the motion sensor(s) 168, and in response to detecting the event, activate the camera 104 of the power-limited security device 100, 200 to start recording the images 242 at the second image-capture frequency 242F. In such an example, the detection of the event at block 420 may be based on a second motion threshold. However, in some of the present embodiments, the motion sensor(s) 168 may switch to the operational mode of block 412 in response to a first motion threshold being met, where the first motion threshold is less than (e.g., requires less detected motion) than the second motion threshold. In response to the first motion threshold being met, the camera 104 may be switched from the power-save mode to the operational mode to begin capturing the images 241 at the first image-capture frequency 241F. Once in the operational mode, the second motion threshold may be met, and the camera 104 may then be switched to the operational mode of block B432, described below, where the camera 104 begins capturing the images 242 at the second image-capture frequency 242F.

In an example where the motion sensor(s) are PIR sensors, the first motion threshold may be a first voltage amount (e.g., 1 V, 1.5 V, etc.) and the second motion threshold may be a second voltage amount (e.g., 3 V, 4 V, etc.). In an example where the first motion threshold is not implemented, the camera 104 may not be activated in response to the first voltage amount being detected by the motion sensor(s) 168 (e.g., when a person is approaching the power-limited security device 100, 200 but is not in close enough proximity to generate the second voltage amount), but may only be activated in response to the second motion threshold being reached (e.g., when the person is within 20 feet of the power-limited security device 100, 200). However, by implementing the first motion threshold, the camera 104 may be activated to begin capturing the images 241 at the first image capture frequency 241F in response to the first motion threshold being met (e.g., to capture 10 fps of the person approaching the power-limited security device 100, 200), and then the camera 104 may be activated to capture the images 242 at the second-image capture frequency 242F in response to the second motion threshold being met (e.g., to capture 60 fps of the person when the person is within 20 feet of the power-limited security device 100, 200). In embodiments where the first motion threshold is met but the second motion threshold is not met, the camera 104 may return to the power-save mode once the motion detected drops below the first motion threshold and/or after an amount of time that the second motion threshold is not met (e.g., 5 seconds, 10 seconds, 20 seconds, or 30 seconds).

Block 414 is one of capturing at least one image of the monitored area each time the camera 104 is in the operational mode. In an example of block 414, the camera 104 may capture the images 241 of the monitored area 101 each time the camera 104 is in the operational mode. For example, if the first image-capture frequency 241F is 10 fps, the camera 104 may be activated ten times each second to capture one of the images 241.

Block 416 is one of storing the captured images in a cyclic buffer of the memory at the first rate. In an example of block 416, the power-limited security device 200 stores the images 241 in the cyclic buffer 248 each time the camera 104 captures the images 241. Once the cyclic buffer 248 is full, the power-limited security device 200 may store the images 241 in the cyclic buffer 248 by overwriting the oldest images 241 in the cyclic buffer 248 with the newly captured images 241.

Block 420 is one of detecting, while capturing and storing the images at the first rate, the event within the monitored area. That is, block 420 is one of detecting the event within the monitored area while executing blocks 414 and 416. In an example of block 420, the power-limited security device 200 may detect an event within the monitored area 101 while executing blocks 414 and 416. The power-limited security device 200 may detect the event via at least one of the motion sensor 168 and the microphone 106, for example.

The pre-roll image capture method 400 includes blocks 432, 434, 442, 444, 446, 450, and 460, which may be executed after the detection of the event within the monitored area about the power-limited security device 100, 200.

Block 432 is one of switching the camera into the operational mode. In an example of block 432, the processor 162 may switch the camera 104 into the operational mode.

Block 434 is one of capturing, with the camera, video images of the monitored area at a second rate. In an example of block 434, the camera 104 may capture the images 242 at the second image-capture frequency 242F.

Block 442 is one of executing, by the processor, a write operation to write the video images into the cyclic buffer at the second rate. In example of block 442, the processor 162 may execute a write operation to write the images 242 into the cyclic buffer 248 at the second image-capture frequency 242F.

Block 444 is one of executing, by the processor, a read operation to read the images from the cyclic buffer at a first read rate that is greater than the second rate, while the processor continues to execute the block 442 of writing the video images into the cyclic buffer at the second rate. In an example of block 444, the processor 162 may execute a read operation to read the images 241 from the cyclic buffer 248 at a first read rate that is greater than the second image-capture frequency 242F, while the processor 162 continues to execute block 442.

Block 446 is one of reading the images out of the cyclic buffer at the first read rate until the read operation (of block 444) catches up to the write operation (of block 442). In an example of block 446, the processor 162 may continue to read the images 242 out of the cyclic buffer 248 at the first read rate until the read operation catches up to the write operation of block 442.

Block 450 may occur after the read operation (of block 444) catches up to the write operation (of block 442). Block 450 is one of reading the video images out of the cyclic buffer at a second read rate equal to the second rate. In an example of block 450, the processor 162 may read the images 242 out of the cyclic buffer 248 at a second read rate equal to the second image-capture frequency 242F.

An embodiment of the pre-roll image capture method 400 may include block 452 which, like block 450, may occur after the read operation (of block 444) catches up to the write operation (of block 442). In block 452, the processor continues to write the video images into the cyclic buffer at the second rate. In an example of block 452, the processor 162 may continue to write the video images 242 into the cyclic buffer 248 at the second image-capture frequency 242F.

Block 460 is one of transmitting streaming video to a client device, wherein a beginning portion of the streaming video is streamed at a first stream rate and thereafter the streaming video is streamed at a second stream rate less than the first stream rate. Put another way, a beginning segment of the streaming video is streamed at a first stream rate and subsequent segments of the streaming video are streamed at the second stream rate. In an example of block 460, the communication module 290 may transmit streaming video (e.g., the images 241 and 242) to the user's client device 114 such that a beginning segment of the streaming video is streamed at a first stream rate and subsequent segments of the streaming video are streamed at a second stream rate that is less than the first stream rate.

Figure 5:
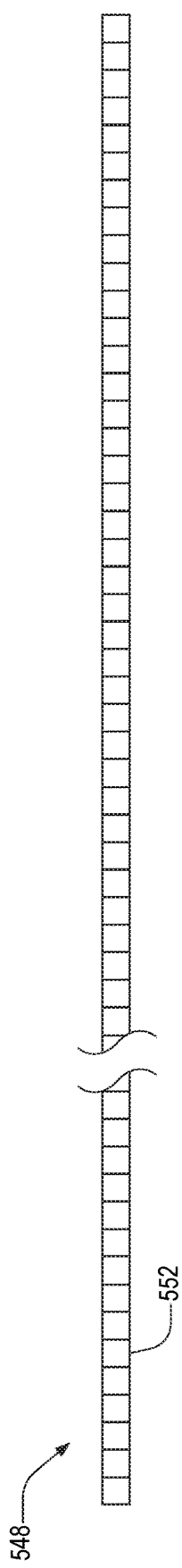

In some embodiments, the memory into which the video image data is written comprises a rolling buffer. A rolling buffer, which may also be referred to as a circular buffer, a circular queue, a cyclic buffer, or a ring buffer, is a data structure that uses a single, fixed-size buffer as if it were connected end-to-end. FIG. 5 is a schematic diagram of a rolling buffer 548, which is an example of the cyclic buffer 248 of the power-limited security device 200 (FIG. 2).

The rolling buffer 548 includes a plurality of segments or blocks 552. In the initial state of FIG. 5, which may correspond to the power-limited security device 200 being in a powered-down state (e.g., not activated, no power source, after performing a reset, etc.), each of the blocks 552 may be empty. When the power-limited security device 200 is powered up (e.g., activated), the camera 104 may begin recording the images 241 (e.g., in the operational mode of block 414 of FIG. 4) of the area within its field of view at the first image-capture frequency 241F. The images 241 may be written into the rolling buffer 548 by a write operation 554, which may be executed by the processor 162, for example. Write operation 554 is an example of block 416 of the pre-roll image capture method 400, FIG. 4. For example, each time the power-limited security device 200 is switched into the operational mode (at block 412), the camera 104 may capture one of the images 241, and the processor 162 may store the one of the images 241 in the rolling buffer 548. As described below, after detecting an event within the monitored area 101, each of the images 241 in the rolling buffer 548 may be presented as part of the video image data (e.g., the part of the video image data that was recorded prior to the detection of the event).

Figure 6:
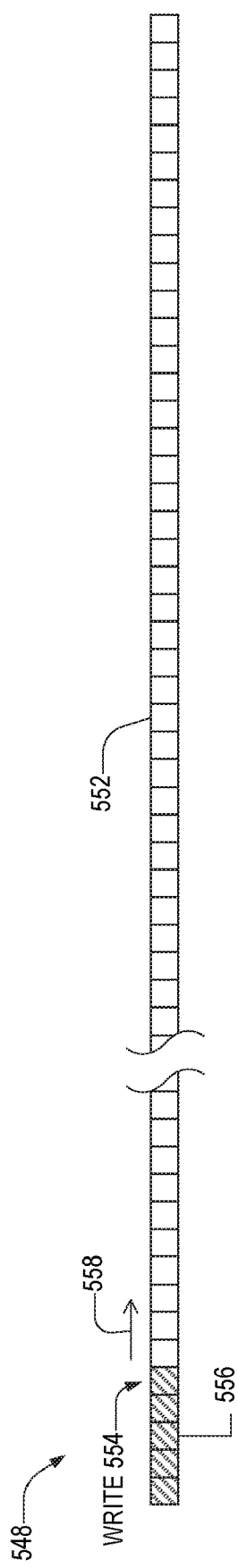

With reference to FIG. 6, as the write operation 554 proceeds, each of the blocks 552 of the rolling buffer 548 receives and stores a portion of the video image data, as represented by patterned blocks 556 to the left of the write operation 554. In the illustrated embodiment, the write operation 554 begins at the left side of the rolling buffer 548 and proceeds from left to right, as indicated by the arrow 558. The illustrated example is, however, not limiting and not intended to be representative of the actual physical layout of the rolling buffer 548.

In some embodiments, each block 552 of the rolling buffer 548 may correspond to one frame of video image data (e.g., one of the images 241). That is, each block 552 may store one video frame, and the blocks 552 may be referred to interchangeably as frames. Thus, a size of each block 552 may correspond to a size of each video frame. In some embodiments, the size of each block 552 may vary. That is, some blocks 552 may be larger or smaller than other blocks 552. For example, without limitation, the blocks 552 including the images 241 may include a single frame (e.g., where the first image-capture frequency 241F is 1 fps), while the block 552 including the images 242 may include 30 frames (e.g., where the second image-capture frequency 242F is 30 fps). In such an example, each of the blocks 552 may represent one second, such that each of the blocks 552 includes each of the frames captured by the camera 104 in one second.

Figure 7:
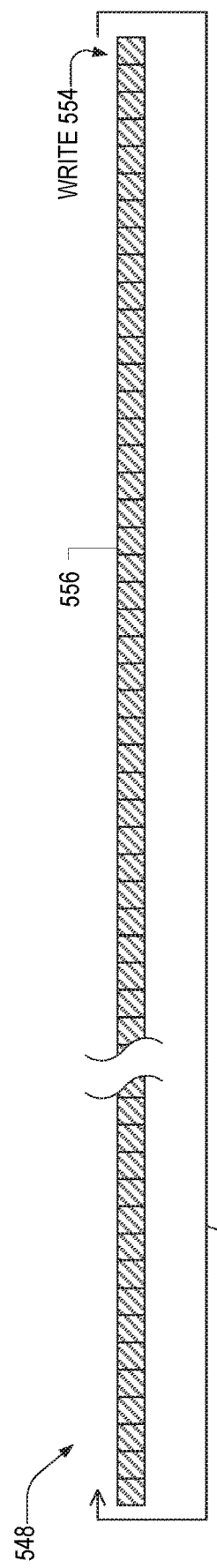

As the write operation 554 continues, more and more blocks 552 receive and store the video image data. With reference to FIG. 7, eventually the rolling buffer 548 may be completely filled with the video image data, as represented by the patterned blocks 556. The write operation 554 then continues at the beginning of the rolling buffer 548, as indicated by a return arrow 560 in FIG. 7. As the write operation 554 continues, the old video image data in each block 556 is overwritten with new video image data. This process may be repeated any number of times. For example, the rolling buffer 548 may include fifteen seconds (e.g., fifteen blocks) of the video image data. As such, in an example where the first image-capture frequency 241F is 1 fps, if a motion event is not detected within fifteen seconds, the rolling buffer 548 may be full, such that the rolling buffer 548 includes fifteen frames of the images 241 (one frame from each time the camera 104 is put into the operational mode at block 414). In such an example, if motion is not detected beyond the fifteen seconds, the blocks 556 of the rolling buffer 548 are overwritten. The size of the rolling buffer 548 may be determined by a desired amount of video image data to be stored. Although the above examples describe the rolling buffer 548 storing fifteen seconds of the video image data, in some embodiments, without limitation, the rolling buffer 548 may have sufficient size to store five seconds of video image data, or ten seconds of video image data, or fifteen seconds of video image data, or twenty seconds of video image data, or any other amount of video image data.

With reference back to FIG. 4, at block 420 the pre-roll image capture method 400 detects the event in the monitored area. In some embodiments, the determination of the motion being detected may be made by the processor 162. For example, the processor 162 may receive an input from the camera 104 and/or from a separate motion sensor, such as the motion sensor(s) 168 of FIG. 2, indicative of motion within the field of view of the camera 104 and/or the field of view of the motion sensor. In another example, the input device 282 may include a button, and the processor 162 may receive an input from the input device 282 indicating that the button has been pressed.

The determination of motion may be made while the write operation 554 continues writing the video image data into the rolling buffer 548. However, after the motion is detected, the video image data (e.g., the images 242) may be written into the rolling buffer 548 at the second image-capture frequency 242F. For example, as described above, where each block 552 of the rolling buffer 548 includes the video image data captured by the camera 104 each second, the blocks 556 may be overwritten with the images 242 at the second image-capture frequency 242F (e.g., 30 fps), such that each block 552/556 includes thirty frames (e.g., thirty of the images 242). In other examples, as described above, each of the blocks 552/556 may include one frame such that each of the images 242 overwrites one of the blocks 552/556.

Figure 8:
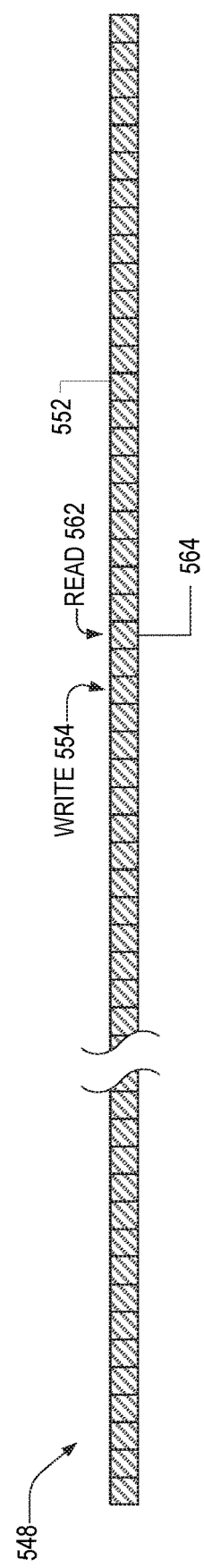

FIG. 8 illustrates the beginning of the read operation 562. The read operation 562 begins at the beginning of the rolling buffer 548, which in some embodiments may be whichever buffer block 552/556 contains the oldest video image data. Again, in the example illustrated in FIGS. 5-11, the write operation 554 moves through the rolling buffer 548 from left to right. Therefore, if all buffer blocks 552 contain video image data, then the oldest video image data is stored in whichever buffer block is just ahead of the write operation 554, which in FIG. 8 is the buffer block 564 just to the right of the write operation 554. This buffer block 564 is the "beginning" of the rolling buffer 548, and is where the read operation 562 begins. Because the write operation 554 may be continuous for as long as the camera is on (e.g. after the event is detected), the location of the "beginning" of the rolling buffer 548 is constantly changing.

In the present embodiments, the read operation 562 may begin at a first read rate that is greater than the write rate. This aspect enables the read operation 562 to catch up to the write operation 554, so that when the read operation 562 catches up to the write operation 554 the streaming video is real time (e.g., little to no delay between events happening within the field of view of the camera 104 and those events being depicted on the display of the user's client device 114). In some embodiments, the first read rate may be a multiple of the write rate that is greater than one. In some non-limiting examples, the first read rate may be a factor m times the write rate, where, for example m∈{1.1, 1.2, 1.3, . . . , 2.8, 2.9, 3.0}. While the read operation 562 commences, the write operation 554 may continue to write the video image data into the rolling buffer 548 at the write rate.

The process then moves to the read operation 562 of continuing to read the video image data out of the rolling buffer 548 at the first read rate until the read operation 562 catches up to the write operation 554. The read operation 562 is an example of block 446 of the pre-roll image capture method 400, FIG. 4. After the read operation 562 catches up to the write operation 554, the read operation 562 continues to read the video image data out of the rolling buffer 548 at a second read rate that is equal to the write rate. Meanwhile, the write operation 554 continues to write the video image data into the rolling buffer 548 at the write rate.

FIGS. 9-11 illustrate the read operation 562 and the write operation 554 continuing at different rates until the read operation 562 catches up to the write operation 554. With reference to FIG. 9, as the read operation 562 reads the video image data out of the rolling buffer 548 a separation appears between the read operation 562 and the write operation 554, as indicated by the spacing between the read operation 562 and the write operation 554 in FIG. 9 and by the empty blocks 552 of the rolling buffer 548 (these blocks 552 have had their video image data read out and the write operation 554 has not yet reached these blocks 552 to write new video image data into the empty blocks 552). With reference to FIG. 10, the separation between the read operation 562 and the write operation 554 continues to grow due to the read operation 562 progressing at a faster rate than the write operation 554. With reference to FIG. 11, eventually the read operation 562 catches up to the write operation 554 (e.g., the read operation 562 is one buffer block behind the write operation 554), at which point the rate of the read operation 562 drops to match the rate of the write operation 554.

While the pre-roll image capture method 400 describes only video image data that is written into and read out of the cyclic buffer 248, the present embodiments contemplate that audio may also be incorporated into one or more processes. For example, the audio data captured by the microphone 106 of the power-limited security device 200 may also be written into and read out of the cyclic buffer 248 in a process similar to that described with reference to the pre-roll image capture method 400. Alternatively, the audio data captured by the microphone 106 may be written into and read out of another memory, such as a different portion of the memory 140 or a memory location remote from the power-limited security device 200. The steps of the process of the pre-roll image capture method 400 need not be performed in the order presented, and may be performed in any order(s).

The processes described above with respect to FIGS. 3 and 4 enable the user/owner of the power-limited security device 100, 200 to view images (e.g., the images 241) that are recorded prior to the detection of a motion event while still preserving the life of the battery (e.g., the battery 260(1) and/or 260(2)). For example, because the images 241 may be captured at the first image-capture frequency 241F (e.g., 1 fps) when no motion is detected, the camera 104 is not required to record constantly, but only during the time that the camera 104 is in the operational mode, and thus the camera 104 may not constantly require power from the power source 205. In addition, in response to motion being detected by the power-limited security device 100, 200, the user of the user's client device 114 associated with the power-limited security device 100, 200 may still be able to view the video image data (at least in the form of still images, such as the images 241), that was captured prior to detecting the motion. This video image data captured prior to detecting the motion may include useful information, such as an image of a person, animal, or object that caused the determination that motion is present in the monitored area 101. For example, if a person runs through the monitored area 101 of the power-limited security device 100 fast enough, or a car speeds through the monitored area 101, by the time the motion sensor(s) 168 detect the motion, the person or car may be gone from the monitored area 101 (e.g., outside of the field of view of the camera 104), such that the user may not be able to clearly view the cause of the motion (e.g., the person or the car) in the video image data. However, because the camera 104 is activated to record the images 241 at the first image-capture frequency 241F (e.g., during the operation mode) when no motion is detected (or an amount of motion detected is below a threshold for activating the camera 104 to record at the second image-capture frequency 242F), at least one of the images 241 may include the person or car. As such, the user of the user's client device 114 may still be able to view (at least in the form of a still image(s)) the person or the car even though the person or the car may not be present in the images 242 recorded at the second image-capture frequency 242F. Ultimately, as a result, the user of the user's client device 114 may be able to make a more informed decision as to an action to take in response to viewing the video image data including the images 241 (and/or the images 242), such as to alert law enforcement, signal an alarm, speak through the speaker 108 of the power-limited security device 100, 200, or the like.

Figure 12:
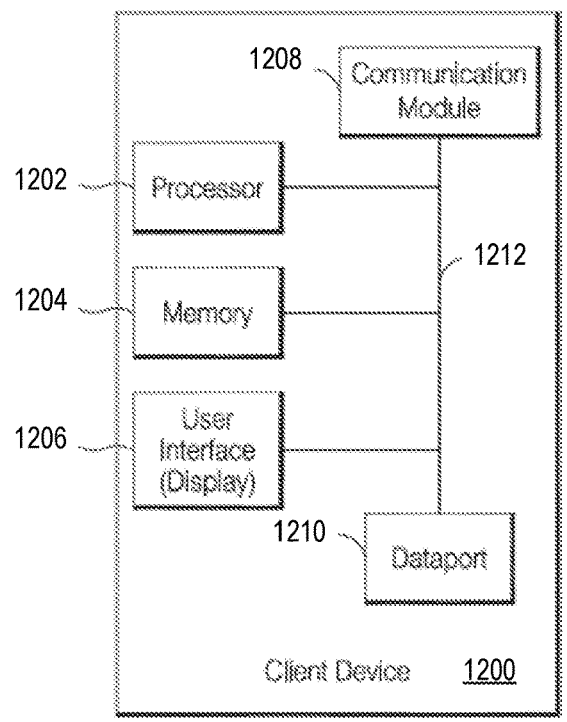
FIG. 12 is a functional block diagram of a client device on which the present embodiments may be implemented according to various aspects of the present disclosure.

FIG. 12 is a functional block diagram of a client device 1200 on which the present embodiments may be implemented according to various aspects of the present disclosure. The user's client device 114 described with reference to FIG. 1 may include some or all of the components and/or functionality of the client device 1200. The client device 1200 may comprise, for example, a smartphone.

With reference to FIG. 12, the client device 1200 includes a processor 1202, a memory 1204, a user interface 1206, a communication module 1208, and a dataport 1210. These components are communicatively coupled together by an interconnect bus 1212. The processor 1202 may include any processor used in smartphones and/or portable computing devices, such as an Advanced RISC Machines (ARM) processor (a processor based on the RISC (reduced instruction set computer) architecture developed by ARM). In some embodiments, the processor 1202 may include one or more other processors, such as one or more conventional microprocessors, and/or one or more supplementary co-processors, such as math co-processors.

The memory 1204 may include both operating memory, such as random access memory (RAM), as well as data storage, such as read-only memory (ROM), hard drives, flash memory, or any other suitable memory/storage element. The memory 1204 may include removable memory elements, such as a CompactFlash card, a MultiMediaCard (MMC), and/or a Secure Digital (SD) card. In some embodiments, the memory 1204 may comprise a combination of magnetic, optical, and/or semiconductor memory, and may include, for example, RAM, ROM, flash drive, and/or a hard disk or drive. The processor 1202 and the memory 1204 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1202 may be connected to the memory 1204 via the dataport 1210.

The user interface 1206 may include any user interface or presentation elements suitable for a smartphone and/or a portable computing device, such as a keypad, a display screen, a touchscreen, a microphone, and a speaker. The communication module 1208 is configured to handle communication links between the client device 1200 and other, external devices or receivers, and to route incoming/outgoing data appropriately. For example, inbound data from the dataport 1210 may be routed through the communication module 1208 before being directed to the processor 1202, and outbound data from the processor 1202 may be routed through the communication module 1208 before being directed to the dataport 1210. The communication module 1208 may include one or more transceiver modules capable of transmitting and receiving data, and using, for example, one or more protocols and/or technologies, such a Wi-Fi network compatible with the IEEE 802.11 standard and/or other wireless communication standard(s) including but not limited to WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), Z-Wave, RIM (Research in Motion, Limited) duplex paging network, Bluetooth radio, or an IEEE 802.11-based radio frequency network, or any other protocol and/or technology.

The dataport 1210 may be any type of connector used for physically interfacing with a smartphone and/or a portable computing device, such as a mini-USB port or an IPHONE®/IPOD® 30-pin connector or LIGHTNING® connector. In other embodiments, the dataport 1210 may include multiple communication channels for simultaneous communication with, for example, other processors, servers, and/or client terminals.

The memory 1204 may store instructions for communicating with other systems, such as a computer. The memory 1204 may store, for example, a program (e.g., computer program code) adapted to direct the processor 1202 in accordance with the present embodiments. The instructions also may include program elements, such as an operating system. While execution of sequences of instructions in the program causes the processor 1202 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 13:
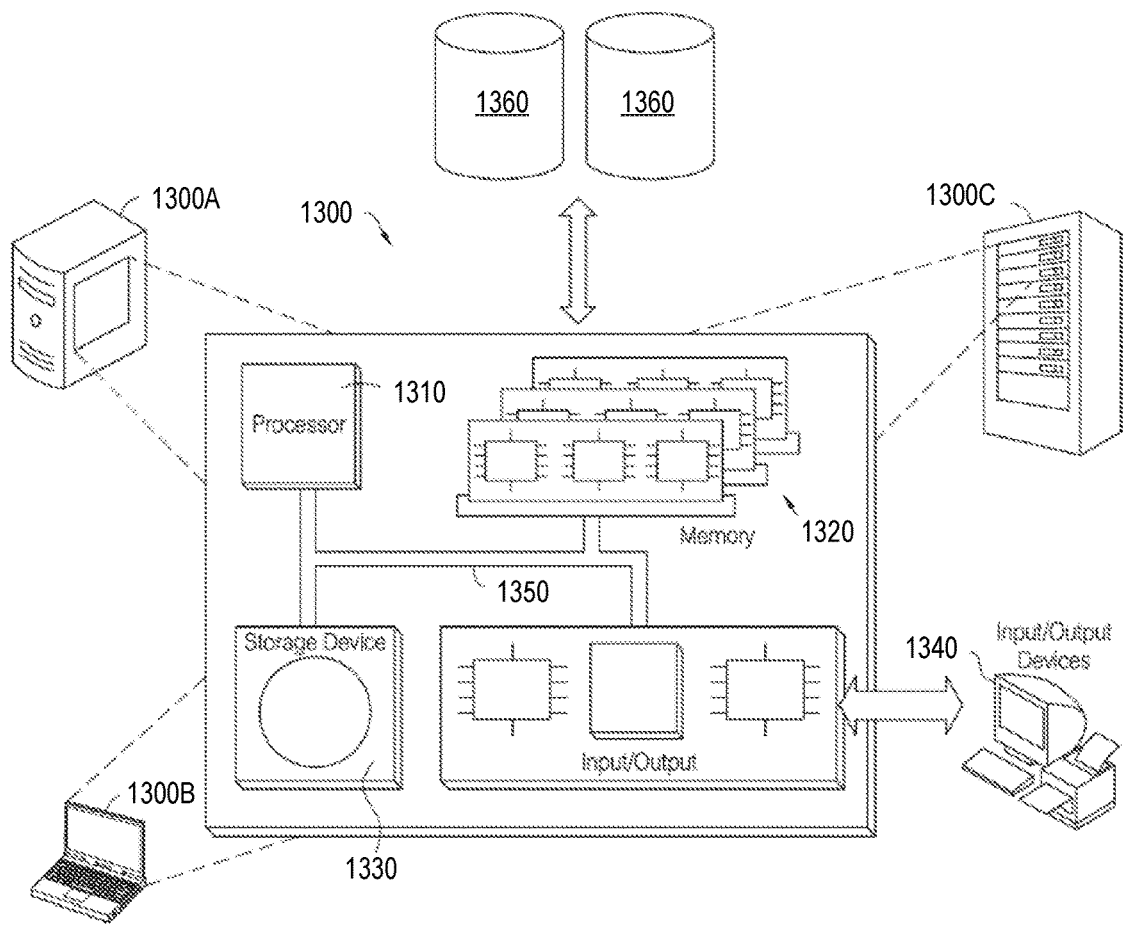
FIG. 13 is a functional block diagram of a general-purpose computing system on which the present embodiments may be implemented according to various aspects of present disclosure.

FIG. 13 is a functional block diagram of a general-purpose computing system on which the present embodiments may be implemented according to various aspects of the present disclosure. The computer system 1300 may be embodied in at least one of a personal computer (also referred to as a desktop computer) 1300A, a portable computer (also referred to as a laptop or notebook computer) 1300B, and/or a server 1300C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers.

The term server may be construed broadly to include any computerized process that shares a resource to one or more client processes.

The computer system 1300 may execute at least some of the operations described above. The computer system 1300 may include at least one processor 1310, memory 1320, at least one storage device 1330, and input/output (I/O) devices 1340. Some or all of the processor 1310, the memory 1320, the storage device 1330, and the I/O device 1340 may be interconnected via a system bus 1350. The processor 1310 may be single- or multi-threaded and may have one or more cores. The processor 1310 may execute instructions, such as those stored in the memory 1320 and/or in the storage device 1330. Information may be received and output using one or more I/O devices 1340.

The memory 1320 may store information, and may be a computer-readable medium, such as volatile or non-volatile memory. The storage device(s) 1330 may provide storage for the computer system 1300, and may be a computer-readable medium. In various aspects, the storage device(s) 1330 may be a flash memory device, a hard disk device, an optical disk device, a tape device, or any other type of storage device.

The I/O devices 1340 may provide input/output operations for the computer system 1300. The I/O devices 1340 may include a keyboard, a pointing device, and/or a microphone. The I/O devices 1340 may further include a display unit for displaying graphical user interfaces, a speaker, and/or a printer. External data may be stored in one or more accessible external databases 1360.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method implemented by an electronic device having a camera, the method comprising:
    capturing, using the camera, a first plurality of images at a first frequency;
    storing the first plurality of images in a buffer of the electronic device;
    detecting an event within a field of view of the electronic device; and
    in response to detection of the event:
        capturing, using the camera, a second plurality of images at a second frequency greater than the first frequency;
        storing, via a write operation, the second plurality of images in the buffer;
        reading, until a read operation catches up to the write operation and at a read rate greater than the second frequency, stored images from the buffer, the stored images including the first plurality of images and the second plurality of images; and
        transmitting the stored images to at least one of a server or a client device associated with the electronic device;
    after the reading:
        capturing, using the camera, a third plurality of images at the second frequency; and
        transmitting the third plurality of images to the at least one of the server or the client device.

2. The method of claim 1, further comprising, switching the camera out of a power-save mode in response to detection of the event.

3. The method of claim 1, further comprising activating a controlled component of the electronic device or communicatively coupled to the electronic device based at least in part on the event being detected.

4. The method of claim 3, the controlled component comprising at least one of a doorbell, an internal floodlight, or an external floodlight.

5. The method of claim 1, the first frequency requiring reduced power consumption by the camera of the electronic device as compared to power consumption used by the camera at the second frequency.

6. The method of claim 1, wherein the first frequency is 10 frames-per-second and the second frequency is 30 frames-per-second.

7. The method of claim 1, wherein the transmitting the stored images and the third plurality of images comprises transmitting the stored images and the third plurality of images to the client device via the server.

8. The method of claim 7, wherein the stored images and the third plurality of images are stored at the server.

9. The method of claim 1, wherein the capturing the first plurality of images includes switching the camera, at the first frequency, from a power-save mode, to an operational mode, and back to the power-save mode, to capture at least one of the first plurality of images.

10. The method of claim 1, the step of detecting the event comprising detecting movement in the field of view of the electronic device using a passive infrared sensor.

11. The method of claim 1, the step of detecting the event comprising detecting a number of changed pixels in different video frames captured by the camera.

12. The method of claim 1, the step of detecting the event comprising detecting a front button of the electronic device being pressed.

13. The method of claim 1, further comprising, prior to transmitting the third plurality of images:
    storing the third plurality of images in the buffer; and
    reading the stored images from the buffer.

14. The method of claim 1, wherein the read operation catches up to the write operation when the read operation is one buffer block behind the write operation.

15. An electronic device, comprising:
a battery;
a camera;
a motion sensor;
one or more processors; and
a memory storing machine-readable instructions that, when executed by the one or more processors, cause the one or more processors to:
capture a first plurality of images at a first frequency when no motion is detected in at least one of a field of view the camera or a field of view of the motion sensor;
store the first plurality of images in a buffer;
capture, using the camera, a second plurality of images at a second frequency greater than the first frequency after motion is detected in at least one of the field of view of the camera or the field of view of the motion sensor;
store, via a write operation, the second plurality of images in the buffer;
read, until a read operation catches up to the write operation and at a first read rate greater than the second frequency, stored images from the buffer, the stored images including the first plurality of images and the second plurality of images; and
transmit the stored images to at least one of a server or a client device associated with the electronic device;
after the read operation catches up to the write operation:
capture, using the camera, a third plurality of images at the second frequency; and
transmit the third plurality of images to the at least one of the server or the client device.

16. The electronic device of claim 15, wherein the electronic device uses less power when capturing the first plurality of images at the first frequency than when capturing the second and third plurality of images at the second frequency.

17. The electronic device of claim 15, wherein the first frequency is 10 frames-per-second and the second frequency is 30 frames-per-second.

18. The electronic device of claim 15, the instructions that capture the first plurality of images including instructions that, when executed by the one or more processors, cause the one or more processors to switch the camera, at the first frequency, from a power-save mode, to an operational mode, and back to the power-save mode.

19. A method for an electronic device including a camera, a processor, a memory, and a communication module, the method comprising:
prior to detection of an event within a monitored area about the electronic device:
switching, at a first frequency, the camera from a power-save mode, to an operational mode, and back to the power-save mode;
capturing at least one still image of the monitored area each time the camera is in the operational mode; and
storing the at least one still image in a buffer of the memory;
after detecting the event within the monitored area about the electronic device:
switching the camera into the operational mode;
capturing, with the camera at a second frequency greater than the first frequency, video images of the monitored area;
executing, by the processor, a write operation to write the video images into the buffer;
executing, by the processor, a read operation to read, until the read operation catches up to the write operation and at a first read rate greater than the second frequency, the stored images from the buffer, the stored images including the still images and the video images at a first read rate that is greater than the second frequency;
transmitting, via the communication module, the stored images to a server;
after the read operation catches up to the write operation;
capturing, with the camera at the second frequency, second video images of the monitored area; and
transmitting, by the communication module, the second video images to at least one of a client device or a server.

20. The method of claim 19, wherein the transmitting the stored images and the second video images comprises transmitting the stored images and the second video images to the client device via the server.

* * * * *